H. G. DUNKELBERGER.
Culinary Utensils.
No. 144,518.                    Patented Nov. 11, 1873.
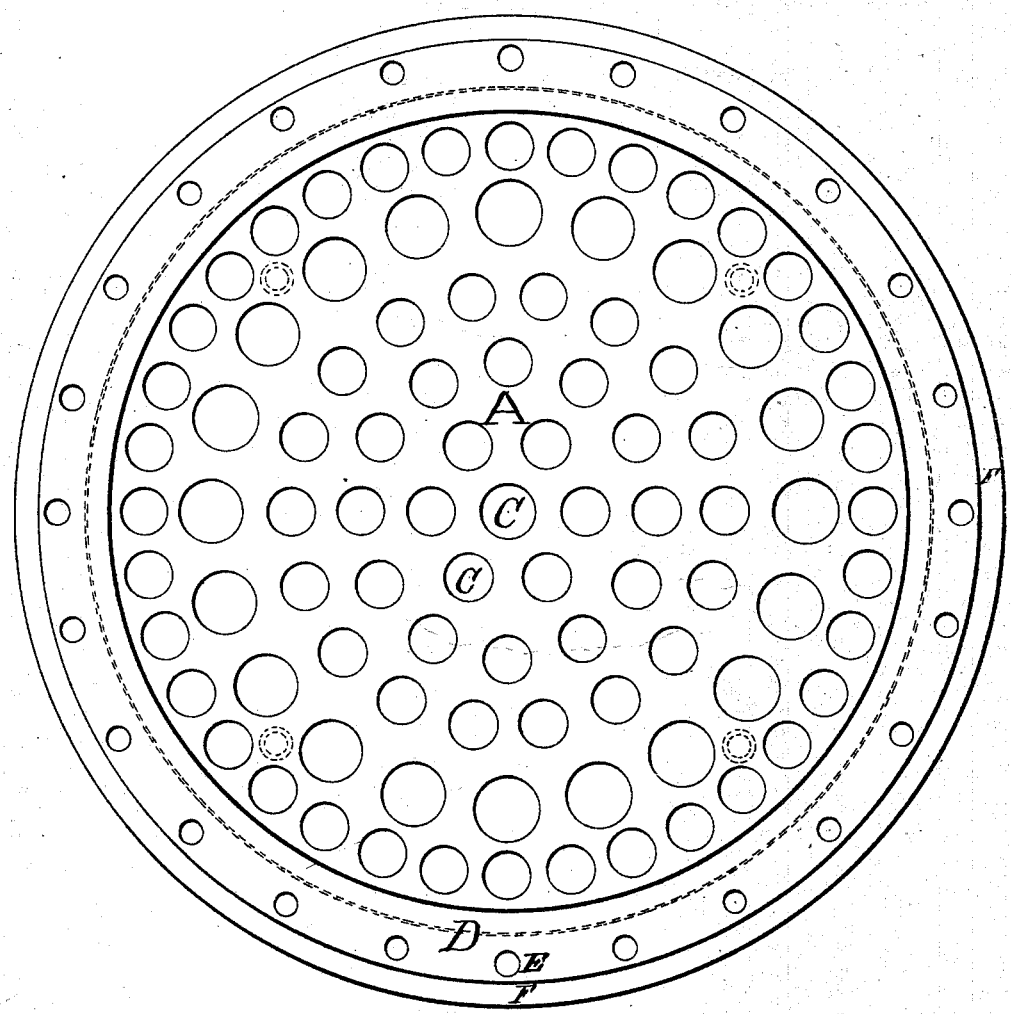
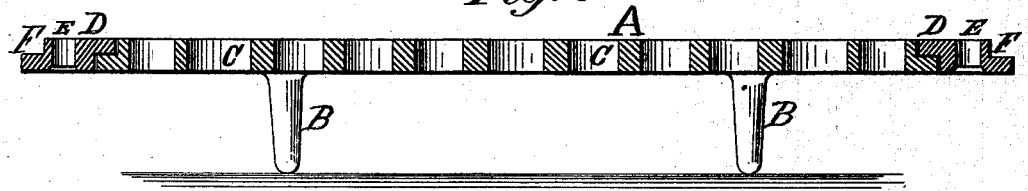
Witnesses.                      Inventor:
Wm Howard                       Henry G. Dunkelberger
A. Gibner                       By Cox and Cox Attys

UNITED STATES PATENT OFFICE.

HENRY G. DUNKELBERGER, OF SHAMOKIN, PENNSYLVANIA.

IMPROVEMENT IN CULINARY UTENSILS.

Specification forming part of Letters Patent No. 144,518, dated November 11, 1873; application filed September 6, 1873.

*To all whom it may concern:*

Be it known that I, HENRY G. DUNKELBERGER, of Shamokin, in the county of Northumberland and State of Pennsylvania, have made and invented a new and useful Improvement in Culinary Utensils, of which the following is a specification:

My invention relates to a new and useful improvement in culinary utensils. Its object is to provide a convenient utensil for cooking articles of food, whereby the cooking may be accomplished without danger of the food being burned by coming in contact with the bottom of the vessel employed, and especially to provide a utensil that may be adapted to vessels of different sizes.

Figure 1 is a plan view of a device embodying the elements of the invention. Fig. 2 is a vertical central section of same.

A is a plate of any convenient form—in the present instance, circular—which I prefer to construct of cast-iron, provided near the periphery, upon its lower side, with the feet B, and having numerous apertures, C C C, of sufficient size and number to permit of a free operation of the heat. The upper edge of the periphery is removed, forming a shoulder or lip, upon which fits the rim D, which is in the form of a ring, and conformed in size to the plate A, having the lower portion of its interior periphery removed so as to fit snugly upon the shoulder or lip of the plate A. The rim D is also provided with apertures E E E, which permit of a free passage of heat, and has the upper portion of its exterior periphery removed, forming a shoulder or lip, F, upon which may rest a second rim, which is constructed in all respects like the rim D.

Any number of rims may be used, whereby the utensil may be enlarged or diminished in size to fit vessels of different dimensions.

The utensil is used as follows: The plate A is set upon its feet B upon the bottom of the vessel employed in cooking, and the article to be cooked placed upon it. In case the vessel is considerably larger than the plate A, the article to be cooked may depend beyond the periphery of the plate and come in contact with the bottom of the vessel. For example, articles such as puddings, which are placed in a bag and then boiled, would, in case of the plate A being smaller than the vessel, be liable to come in contact with its bottom, as above mentioned. To obviate this objection, the rims D and F are provided, which are fitted upon the plate A, at pleasure. If the plate A is of sufficient size, it is used alone; if not, the rims are made use of. Thus, the plate A being of small dimensions, the utensil may be employed in connection with vessels of all sizes, performing its offices successfully in every instance.

I am aware that the plate A alone is not new, and I do not claim it, broadly, as my invention; but What I do claim as my invention, and desire to secure by Letters Patent, is—

The perforated plate or disk A, provided with the lip or shoulder described, in combination with the perforated rim C, provided with the lips and shoulders, substantially as and for the purposes shown and specified.

In testimony that I claim the foregoing improvement in culinary utensils, as above described, I have hereunto set my hand and seal this 27th day of August, 1873.

HENRY G. DUNKELBERGER. [L. S.]

Witnesses:
 W. P. WITHINGTON,
 ABRAM STROUSE.